(12) United States Patent
Hanson

(10) Patent No.: US 8,825,515 B1
(45) Date of Patent: Sep. 2, 2014

(54) SENTIMENT COLLECTION AND ASSOCIATION SYSTEM

(71) Applicant: PulsePopuli, LLC, Omaha, NE (US)

(72) Inventor: Christian Hanson, Omaha, NE (US)

(73) Assignee: PulsePopuli, LLC, Omaha, NE (US)

( * ) Notice: Subject to any disclaimer, the term of this patent is extended or adjusted under 35 U.S.C. 154(b) by 0 days.

(21) Appl. No.: 13/888,775

(22) Filed: May 7, 2013

Related U.S. Application Data

(63) Continuation of application No. 13/661,096, filed on Oct. 26, 2012.

(60) Provisional application No. 61/552,045, filed on Oct. 27, 2011.

(51) Int. Cl.
  *G06Q 50/00* (2012.01)
  *H04L 29/06* (2006.01)
  *G06Q 30/02* (2012.01)

(52) U.S. Cl.
  CPC .............. *H04L 65/403* (2013.01); *G06Q 50/01* (2013.01); *G06Q 30/0203* (2013.01)
  USPC ....................................................... 705/7.32

(58) Field of Classification Search
  None
  See application file for complete search history.

(56) References Cited

U.S. PATENT DOCUMENTS

| | | | |
|---|---|---|---|
| 8,166,032 B2 * | 4/2012 | Sommer et al. ................ | 707/736 |
| 2008/0133488 A1 * | 6/2008 | Bandaru et al. .................... | 707/3 |
| 2009/0265332 A1 | 10/2009 | Mushtaq | |
| 2010/0119053 A1 | 5/2010 | Goeldi | |
| 2010/0121707 A1 | 5/2010 | Goeldi | |
| 2010/0257028 A1 * | 10/2010 | Hillerbrand ...................... | 705/10 |
| 2010/0312769 A1 * | 12/2010 | Bailey et al. ................... | 707/740 |
| 2011/0004483 A1 * | 1/2011 | Ting et al. ....................... | 705/1.1 |
| 2011/0137906 A1 | 6/2011 | Cai | |
| 2011/0153414 A1 | 6/2011 | Elvekrog | |
| 2011/0153542 A1 | 6/2011 | Merugu | |
| 2011/0202617 A1 | 8/2011 | Naidu | |
| 2011/0320542 A1 * | 12/2011 | Bendel et al. ................. | 709/206 |
| 2012/0066212 A1 * | 3/2012 | Jennings ........................ | 707/723 |
| 2012/0101805 A1 * | 4/2012 | Barbosa et al. .................... | 704/9 |
| 2012/0265806 A1 * | 10/2012 | Blanchflower et al. ........ | 709/204 |
| 2013/0018838 A1 * | 1/2013 | Parnaby et al. .................. | 706/52 |
| 2013/0024389 A1 * | 1/2013 | Gupta ............................ | 705/319 |
| 2013/0103386 A1 * | 4/2013 | Zhang et al. ...................... | 704/9 |
| 2013/0103667 A1 * | 4/2013 | Minh ............................. | 707/709 |
| 2013/0117694 A1 * | 5/2013 | Shields et al. ................. | 715/760 |

OTHER PUBLICATIONS

Tianxia, Gong. Processing Sentiments and Opinions in Text: A Survey. ResearchGate [online], [retrieved on Feb. 10, 2014]. Retrieved from the Internet (URL: http://www.researchgate.net/publication/228933153_Processing_Sentiments_and_Opinions_in_Text_A_Survey).*

* cited by examiner

*Primary Examiner* — Matt Kim
*Assistant Examiner* — Daniel Samwel
(74) *Attorney, Agent, or Firm* — Tyson B. Benson; Advent, LLP

(57) ABSTRACT

Disclosed are various implementations of systems, methods, and computer programs that facilitate associating a sentiment with a user-defined topic. In an implementation, a system comprises a computing device in communication with a client device. The computing device includes a memory operable to store one or more modules. The computing device also includes a processor coupled to the memory to retrieve a user-defined topic and a sentiment selection, associate the sentiment with the user-defined topic, and cause generation of graphics at the client device. The graphics represent sentiment statistics corresponding to the sentiment over a predetermined time period.

13 Claims, 8 Drawing Sheets

What do you think about the seasons?

Posted in My Town • 9/30/2012 • 4 responses • posted by @pollposter fall (4)
3 comments
0 — 4 summer (4)
3 comments
1 — 3 spring (4)
3 comments
2 — 2 winter (4)
3 comments
2 — 2

◁ Back to all polls

SENTIMENT COLLECTION AND ASSOCIATION SYSTEM

CROSS-REFERENCE TO RELATED APPLICATIONS

The present application is a continuation under 35 U.S.C. §120 of U.S. patent application Ser. No. 13/661,096 filed Oct. 26, 2012, entitled "SENTIMENT COLLECTION AND ASSOCIATION SYSTEM;" U.S. patent application Ser. No. 13/661,096 claims the benefit under 35 U.S.C. §119 of U.S. Provisional Application Ser. No. 61/552,045, entitled "COMMENT TAGGING AND AGGREGATION SYSTEM," filed on Oct. 27, 2011. U.S. Provisional Application Ser. No. 61/552,045 and U.S. patent application Ser. No. 13/661,096 are herein incorporated by reference in their entirety.

BACKGROUND

Social media websites relate to web-based and mobile technologies that allow users to communicate interactively with other users over the Web. More specifically, social media websites furnish interactive platforms for which individuals and communities create and share user-generated content. Examples of social media websites include FACEBOOK, LINKEDIN, GOOGLE+, PINTEREST, and so forth.

SUMMARY

The present disclosure is directed to a system and method for collecting and associating (e.g., applying, defining, connecting, etc.) a sentiment with user-defined topic. In an implementation, a system comprises a computing device in communication with a client device. The computing device includes a memory operable to store one or more modules. The computing device also includes a processor coupled to the memory to retrieve a user-defined topic and a sentiment selection, associate the sentiment with the user-defined topic, and cause generation of graphics at the client device. The graphics represent sentiment statistics corresponding to the sentiment over a predetermined time period.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description is described with reference to the accompanying figures. The use of the same reference numbers in different instances in the description and the figures may indicate similar or identical items.

FIGS. 5A and 5B are diagrammatic illustrations of an example poll webpage and an example poll results webpage, respectively.

DETAILED DESCRIPTION

A system and a method is described that relate generally to sentiment (e.g., opinion, connotation) aggregation based upon the one or more user-generated postings, such as social media user-generated postings, which may include, but is not limited to: opinions, reviews, ratings, predictions, rankings, recommendations, and votes. Thus, the system described herein is configured to collect and display sentiments of one or more topics from one or more users.

Figure 1:
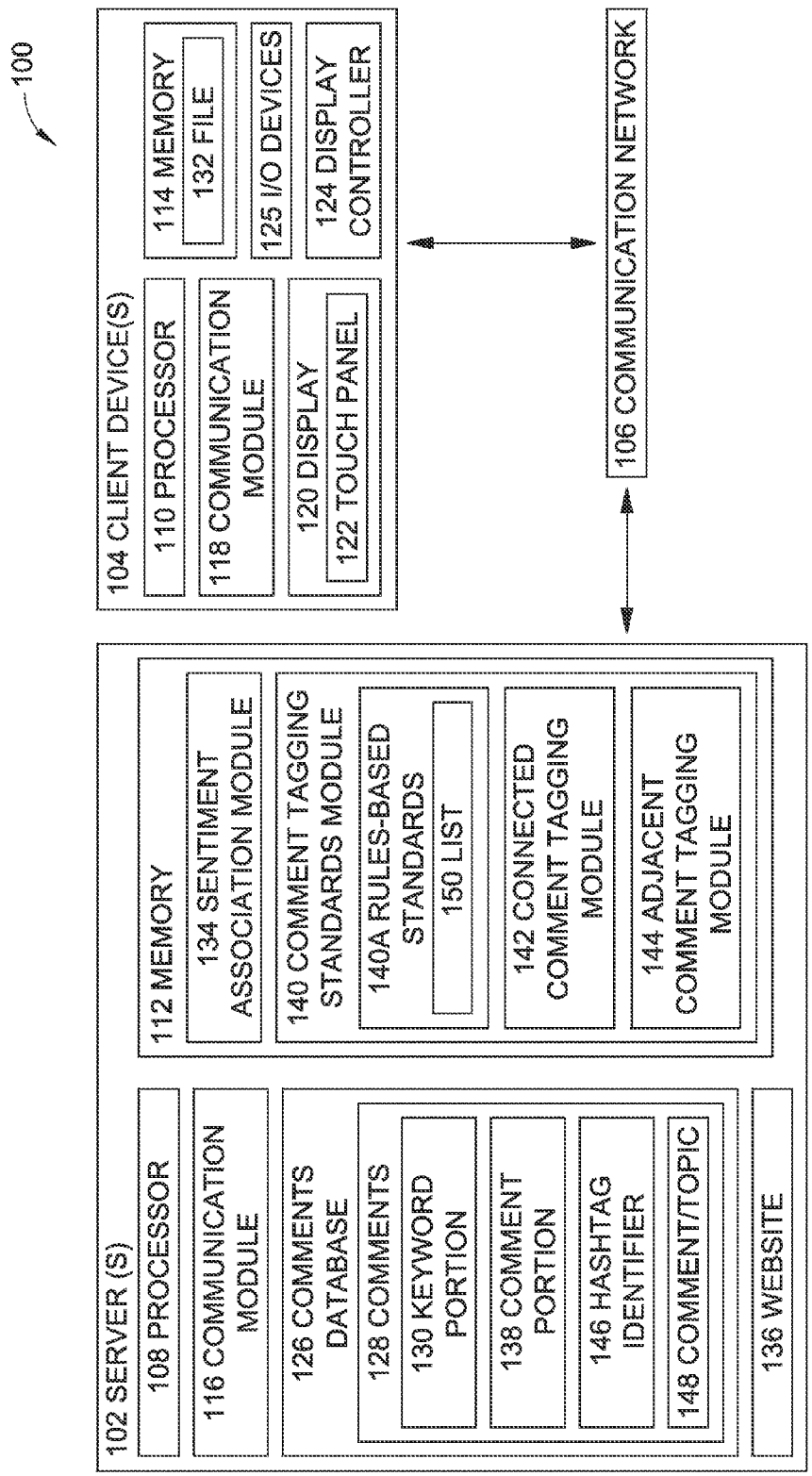
FIG. 1 is an illustration of a system in an example implementation that includes at least one server and at least one client device, where the system is configured to facilitate associating a sentiment with a user-defined topic.

FIG. 1 illustrates a system 100 for facilitating communication between a server 102 and one or more client devices 104 via a communication network 106. In one or more implementations, the client device 104 is a mobile electronic device, such as a mobile phone (e.g., a smartphone), a tablet computer, a personal digital assistant (PDA), a desktop computer, or the like.

As shown in FIG. 1, the server 102 and the client device 104 each include a respective processor 108, 110 and a respective memory 112, 114. The processors 108, 110 provide processing functionality for the server 102 and the client device 104, respectively. The processors 108, 110 may include any number of processors, micro-controllers, or other processing systems, and resident or external memory for storing data and other information accessed or generated by the server 102 and/or the client device 104. The processors 108, 110 may execute one or more software programs (e.g., modules) that implement techniques described herein.

The memory 112, 114 is an example of tangible computer-readable media that provides storage functionality to store various data associated with the operation of the server 102 and the client device 104, software code described herein, or other data to instruct the processors 108, 110 and other elements of the server 102 or the client device 104 to perform the steps described herein. Although a single memory 112, 114 is shown within the server 102 and the client device 104, a wide variety of types and combinations of memory may be employed. The memory 112, 114 may be integral with the respective processor 108, 110, stand-alone memory, or a combination of both. The memory may include, for example, removable and non-removable memory elements such as RAM, ROM, Flash (e.g., SD Card, mini-SD card, micro-SD Card), magnetic, optical, USB memory devices, and so forth.

The server 102 is communicatively coupled to one or more client devices 104 over a communication network 106 via communication modules 116, 118, which are included in the server 102 and the client devices 104, respectively. The communication modules 116, 118 may be representative of a variety of communication components and functionality, including, but not limited to: one or more antennas; a browser; a transmitter and/or receiver (e.g., radio frequency circuitry); a wireless radio; data ports; software interfaces and drivers; networking interfaces; data processing components; and so forth.

The communication network 106 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including, but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP)), Session Initiation Protocol for Instant Messaging and Presence Leveraging Extensions (SIMPLE), and/or Instant Messaging and Presence Service (IMPS), and/or Short Message Service (SMS), or any other suitable communication protocol.

As shown in FIG. 1, the client device(s) 104 includes a touch-sensitive display 120, which can be implemented using a liquid crystal display, an organic light emitting diode display, or the like. In some embodiments, the touch-sensitive display 120 may include a touch panel 122. The touch panel 122 may be, but is not limited to: a capacitive touch panel, a resistive touch panel, an infrared touch panel, combinations thereof, and the like. Thus, the display 120 may be configured to receive input from a user and display information to the user of the client device 104. For example, the display 120 displays visual output to the user. The visual output may include graphics, text, icons, video, and any combination thereof (collectively termed "graphics"). In some embodiments, some or all of the visual output may correspond to user-interface objects, further details of which are described below.

The display 120 is communicatively coupled to a display controller 124 that is configured to receive and/or transmit electrical signals to the touch-sensitive display 120. In an implementation, the touch panel 122 includes a sensor, an array of sensors, or the like, configured to accept input from a user based upon haptic and/or tactile contact. The touch panel 122, in combination with the display controller 124 (along with any associated modules and/or sets of computer-readable instructions in memory 114), detects a point of contact (or points of contact), as well as any movement or breaking of the contact, on the touch panel 122 and converts the detected contact (e.g., a finger of the user, a stylus, etc.) into electrical signals representing interactions with user-interface objects (e.g., buttons, custom views, icons, web pages, images, web page links, etc.) that are displayed via the display 120. The client device 104 may further include one or more input/output (I/O) devices 125 (e.g., a keypad, buttons, a wireless input device, a thumbwheel input device, a trackstick input device, touch-sensitive display 120, and so on). The I/O devices 125 may also include one or more audio I/O devices, such as a microphone, speakers, and so on.

As shown in FIG. 1, the server 102 includes a user-generated comments database 126, which is configured to store user-defined topics, such as user-generated comments 128 that are provided via the client devices 104. For example, a user of a client device 104 may utilize the client device 104 to generate one or more comments 128 (e.g., via the touch-sensitive display 120, the I/O devices 125, etc.). As shown in FIGS. 1 through 5B, the comments 128 include a keyword portion (e.g., topic identifier) 130 that relates to a topic or define a topic (e.g., Fall relates to the fall season; Huskers relates to one or more University of Nebraska-Lincoln athletic events and/or teams; etc.). In an implementation, the keyword portion 130 may be represented by a user-generated hashtag identifier. As described in greater detail herein, a user can cause a sentiment (e.g., connotation) to be associated (e.g., define, apply, connect) with the keyword portion 130 of the comments 128. A sentiment, or connotation, can refer to as a user's attitude, thought, or judgment prompted by feeling towards the topic defined by the keyword portion 130. For instance, the user can cause a positive sentiment (e.g., connotation, opinion, etc.) to be associated with the keyword portion 130 (e.g., #fall, #winter, #Huskers, #Blackshirts, HuskerDefense, HuskerOffense, Husker Defense, Football, etc.) or can cause a negative sentiment to be associated with the keyword portion 130 (e.g., #fall, #winter, #Huskers, #Blackshirts, HuskerDefense, HuskerOffense, Husker Defense, Football, etc.). Thus, the user can define a sentiment with the keyword portion 130. However, in another implementation, the user may utilize the client device 104 to upload (i.e., attach) a file 132 that the user can also define a sentiment with (e.g., user can define a sentiment with the file 132). Thus, the file 132 may be represented as a user-defined topic. For example, the file 132 may be an image file that includes data representing an image, a video file that includes data representing a video. In this example, the user can attach a file 132 and define a connotation with the file 132. The user-defined topic may also represent a uniform resource locator (URL) link that represents a specific character string that constitutes a reference to an Internet resource (e.g., a link to a website, a link to a video uploaded to a website, a link to a news story uploaded to a website, a link to an image uploaded to a website, etc.). In other examples, the user may input Universal Product Codes (UPCs), Quick Response (QR) Codes, SKU codes, unique numbers, or the like, to allow the user to define a sentiment with the associated attached codes/numbers. It is further contemplated that user-defined topics may include topics created from individual users (e.g., individuals having an associated user profile set-up within the website 136) or topics created by managers (e.g., users having managerial roles within the website 136). Thus, it is contemplated that the comments 128 may include pre-populated topics that may be seen by users when the users utilize searching functionality or enter a topic within the topic posting interface (e.g., field 202A described herein). For example, a manager (e.g., a user having managing rights within the system 100) may utilize one or more sub-routines or modules to pre-populate the system 100 with popular topics such that when a user begins to enter a comment 128 corresponding to one of the popular topics, the topic may be automatically be presented to the user based upon a partial entering of the comment 128 (e.g., system 100 completes the comment 128 based upon a partial entering of the comment 128 that correspond to pre-populated terms, etc.).

Figure 2:
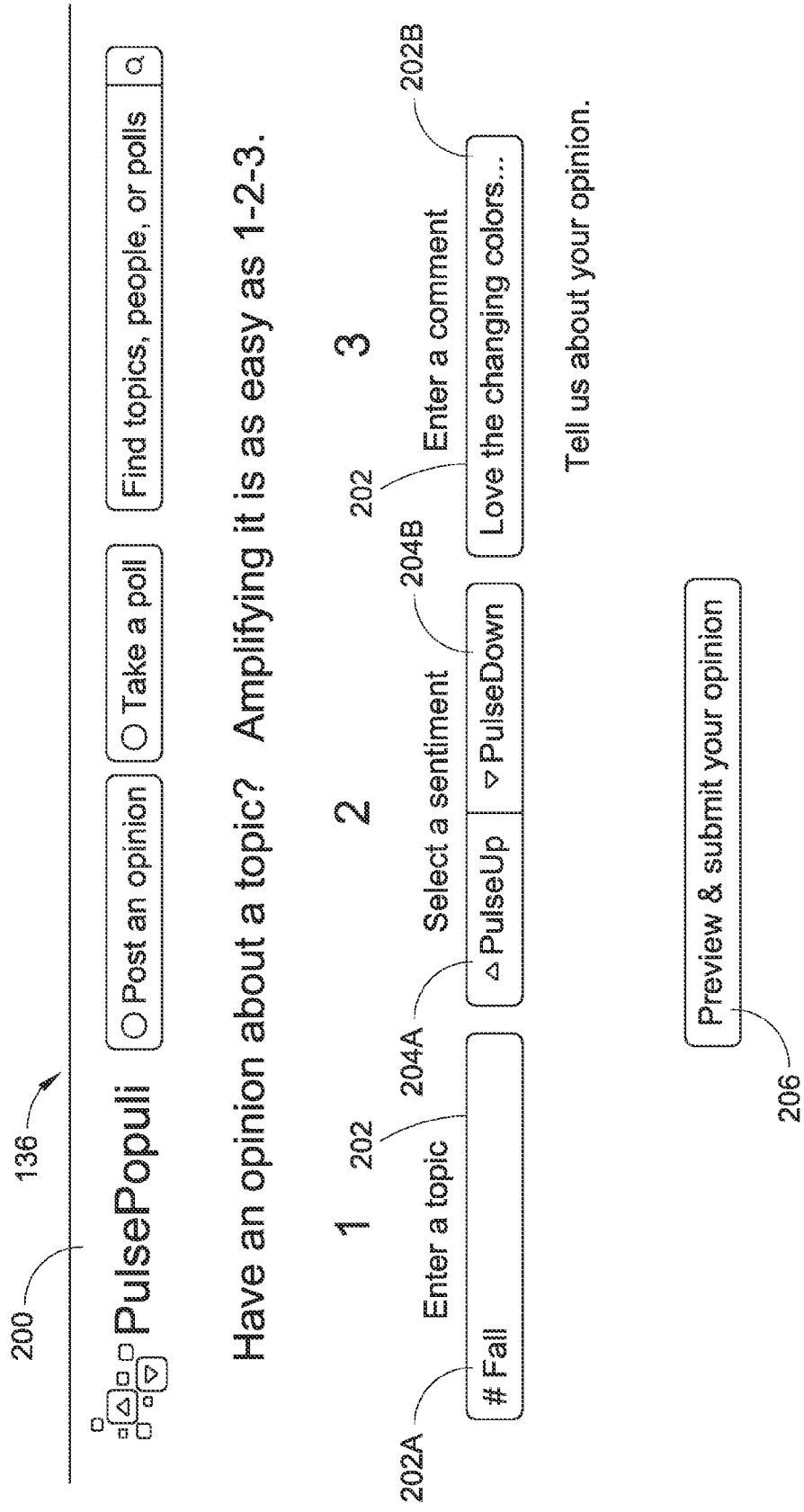
FIG. 2 is a diagrammatic illustration of an example webpage in accordance with a social media networking website employing the present disclosure, where the webpage includes input fields for receiving user-defined topics and sentiment selection interactive interfaces configured to define a sentiment associated with the user-defined topic upon selection of the appropriate interface.
Figure 3:
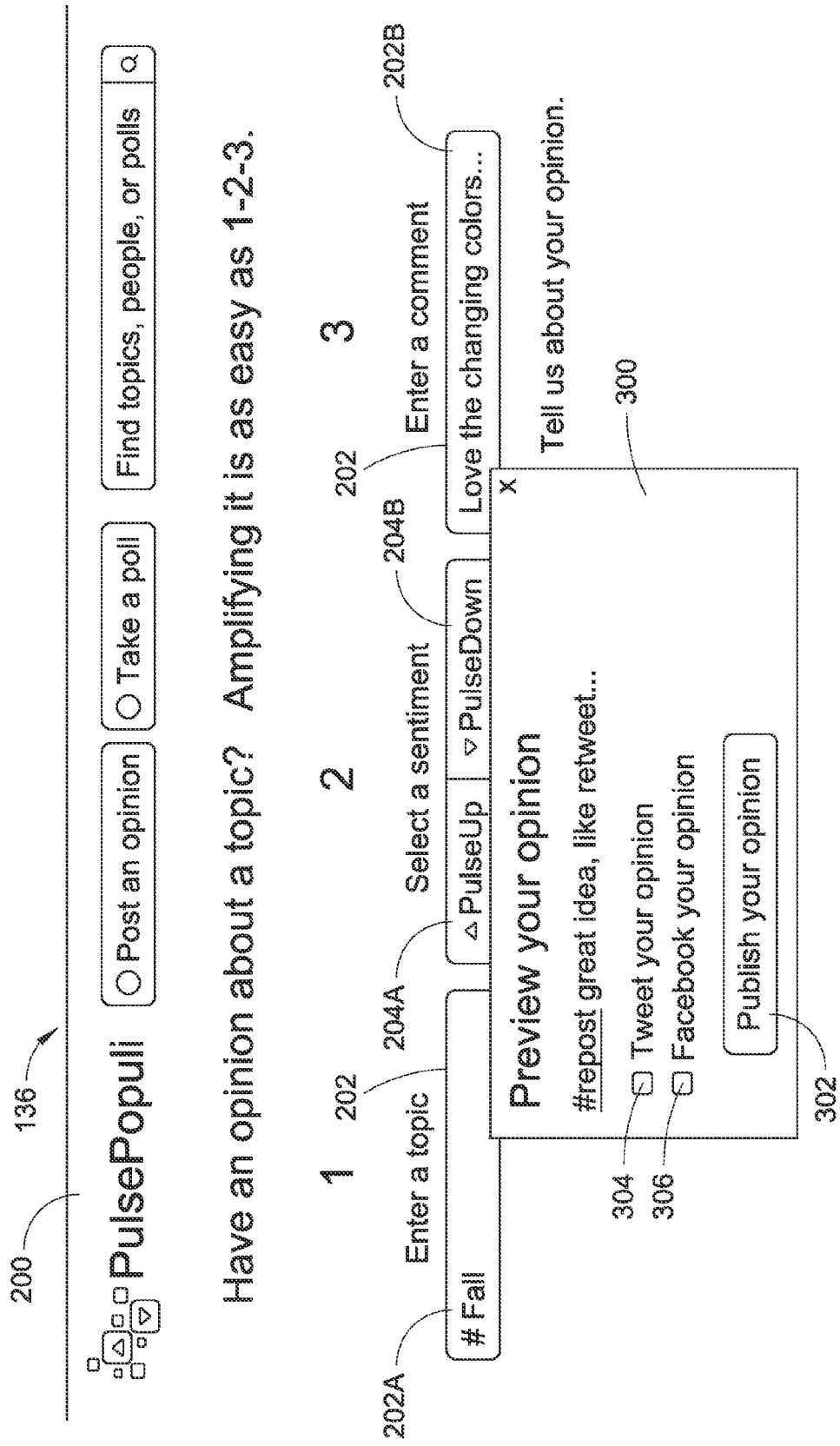
FIG. 3 is another diagrammatic illustration of an example preview webpage pane in accordance with the social media networking website employing the present disclosure, wherein the preview pane conveys a preview of a user's posting.

As shown in FIG. 1, the server 102 includes a sentiment association module 134 which is storable in the memory 112 and executable by the processor 108 (e.g., a program non-transitory computer-readable medium embodying a program executable by the processor 108). The sentiment association module 134 is representative of functionality to associate (e.g., define) a sentiment with the keyword portion 130 or the file 132. As shown in FIG. 3, in an example implementation, the user can access a website 136 hosted by the server 102 (or servers 102). The website 136 may be a social networking website that facilitates communications between users of the website 136. In an implementation, the user may be established within the context of a social networking environment. Thus, a user may establish a profile conveying information relating to the user, which may include, but is not limited to: an avatar, a user name, personal information regarding the user, and so forth. For example, the website 136 may be utilized by multiple users (e.g., multiple user profiles) to build social networks or social relations among other users that have the same or similar interests (FIGS. 2 through 5B illustrate example implementations of potential screen shots of the website 136). Upon accessing the website 136, the server 102 causes the client device 104 to present graphics 200 (e.g., webpage having one or more interactive components) that allow the user to input one or more comments 128. For example, the server 102 (by way of code representing the website 136) causes one or more input fields 202 (202A, 202B) to be presented through the display 120 of the client device 104. The user can input one or more comments 128, which may include the keyword portion 130 and a comment portion 138, which further defines the keyword portion 130 (e.g., comment portion 138 may provide further sentiment relating to the keyword portion 130). For instance, the input field 202A corresponds to an interactive component (e.g., user inputs through the input field 202A) for the keyword portion 130, and the input field 202B corresponds to an interactive component (e.g., user inputs through the input field 202B) for the comment portion 138. As shown in FIG. 2, the client device 104 presents (e.g., is instructed to present) a sentiment selection portion 204. The sentiment selection portion 204 may be represented by graphical interfaces (e.g., interactive buttons, such as PulseUp button 204A and PulseDown button 204B). For example, the user may enter a keyword portion 130 to define a topic of interest via the input field 202A and interface (e.g., select the desired button representing the sentiment, etc.) with the respective button 204A, 204B to associate a sentiment (e.g., define a sentiment with, relate a sentiment with) with the keyword portion 130. Thus, the user can provide the user's opinion regarding a topic or subject by inputting the keyword portion 130, which defines the topic of interest, and selecting the corresponding interactive component (e.g., buttons 204A, 204B) that relates the user's sentiment (opinion) with the keyword portion 130. For example, once a user enters a keyword portion 130, the user can select the appropriate button 204A, 204B to define a sentiment with the user-generated keyword portion 130. Additionally, the user may enter a comment portion 138 via the input field 202B to provide further sentiment to the keyword portion 130. In an implementation, the user may then select an interactive interface 206 that is configured to cause data representing the input information to be transmitted to the server 102 from the client device 104. In another implementation, the website 136 may be implemented in a server-side configuration that receives the input at the server 102 (or servers 102).

In an implementation, upon selecting the interactive interface (component) 206 (e.g., the module 134 retrieves the comment 128 and the sentiment selection), the module 134 is configured to associate the keyword portion 130 of the comments 128 with the selected sentiment (as indicated by the selection of the respective button 204A, 204B). For example, the user may mouse over and select the interactive interface 206 to indicate the user has entered a keyword portion 130 into input field 202A and made a sentiment selection (e.g., selected a respective button 204A, 204B), as well as possibly entering additional comments into input field 202B regarding the topic defined by the keyword portion 130. The module 134 is configured to cause the processor 108 to store the data representing each respective input (e.g., sentiment selection, comment 128, etc.) into the memory 112 and/or the user-generated comments database 126. The module 134 may also cause the display of a preview pane 300 that furnishes a preview of the user's inputs (see FIG. 3). In one or more implementations, the module 134 may interface with other social networking websites, such as FACEBOOK, TWITTER, LINKEDIN, GOOGLE+, or the like, to allow other users of the respective social networking websites to view the user's comments 128 (e.g., social networking postings). For example, the module 134 may interface with a third-party social networking website's application programming interface (API) to cause the user's comments 128 to be posted to the respective website for display in accordance with the social networking website's protocol. However, the user-defined topic may be represented as a link, which when selected by another user, that references a website associated with the system 100, such as the website 136. In another implementation, if the user uploads videos or images (e.g., keyword portion 130 represents videos or images), the module 134 may interface with such social networking websites as PINTEREST, YOUTUBE, or the like. As shown in FIG. 3, the preview pane 300 includes an interactive interface 302 configured to cause publishing of the comments 128 to the website 136 once the interactive interface 302 is engaged (e.g., user selects button, etc.). Additionally, the preview pane 300 may also include interactive interfaces 304, 306 to cause publishing of the comments 128 to one or more social networking websites (e.g., TWITTER, FACEBOOK, etc.). Thus, the interactive interface 302, 304, 306 represent user interfaces to facilitate interaction with various systems and/or components implemented on the server 102.

Figure 4A:
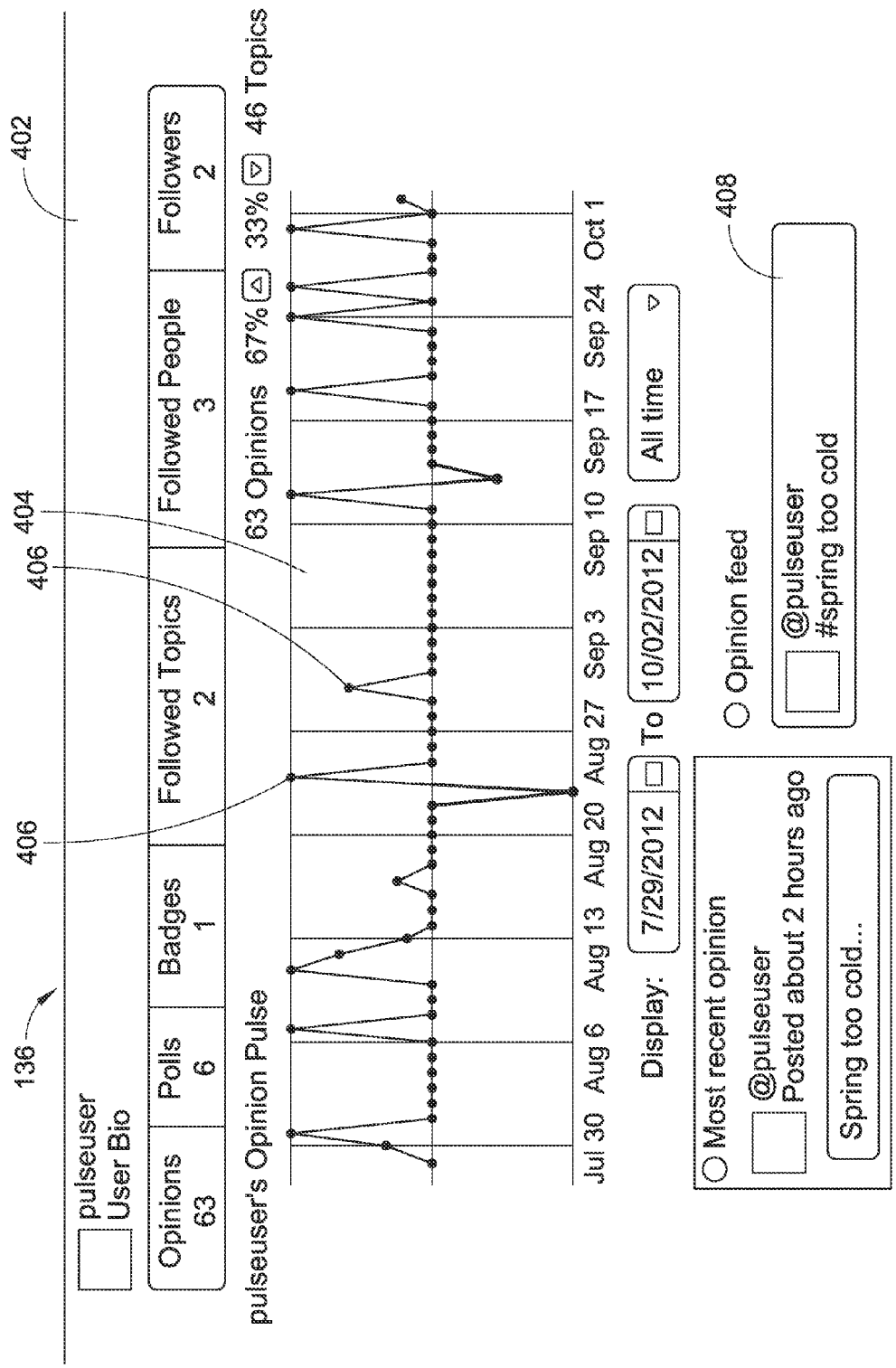
FIG. 4A is a diagrammatic illustration of example graphical representations of sentiment statistical data, where the sentiment statistical data conveys a user's opinion (sentiment) pulse (e.g., the user's opinion relating to one or more user-defined topics over a predetermined time period).
Figure 4B:
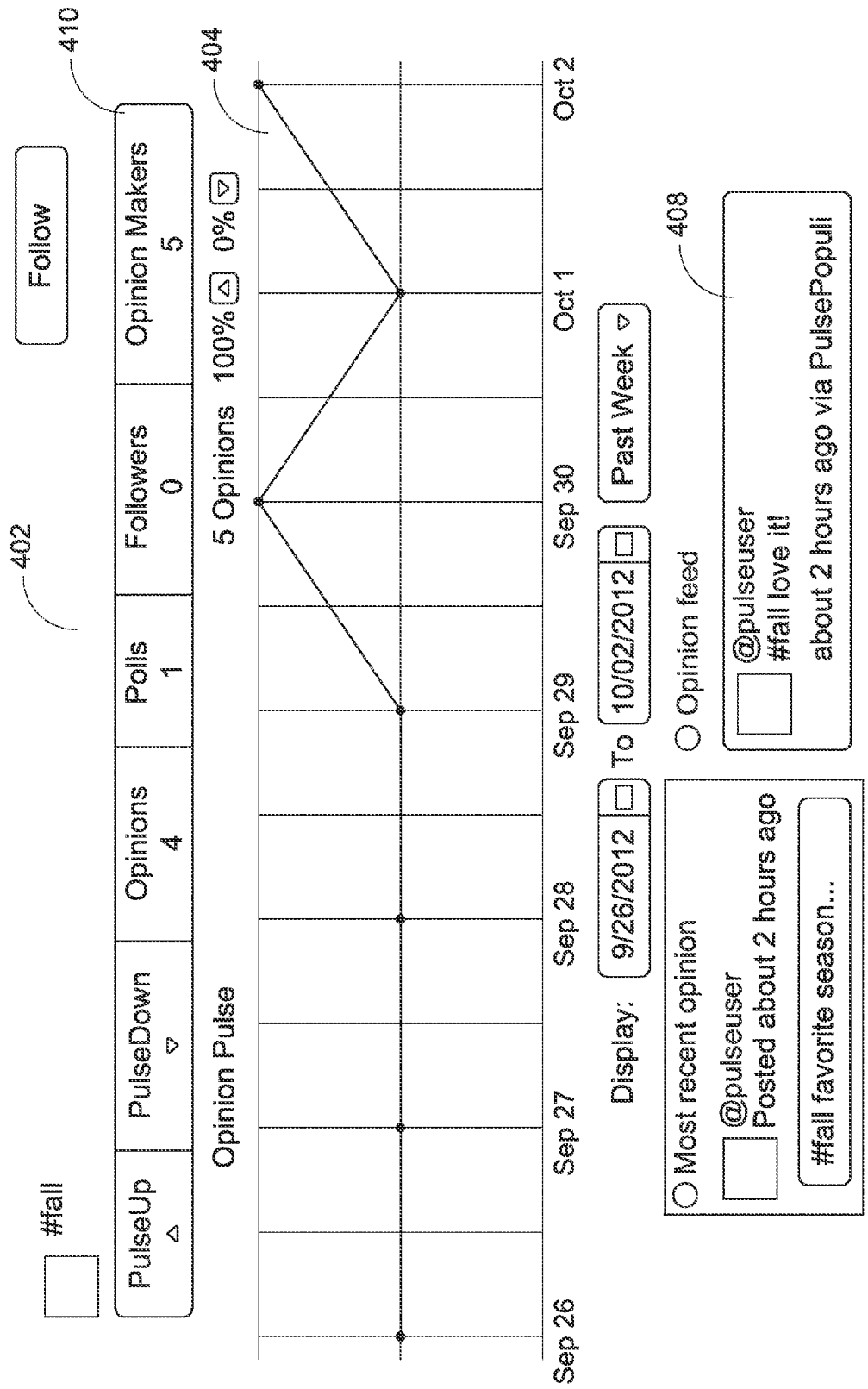
FIG. 4B is another diagrammatic illustration of example graphical representations of sentiment statistical data, where the sentiment statistical data conveys an opinion pulse relating to a specified user-defined topic over a predetermined time period.

The module 134 also represents functionality to furnish one or more graphical displays conveying sentiment statistics (e.g., graphical representations) related to the user's comments 128 (e.g., the keyword portion 130 of the user's comments 128). For example, the module 134 may cause the publishing of a graph representing sentiment statistics corresponding to one or more comments 128 to the display 120 (e.g., graphics 402 are generated on the display 120 to represent various sentiment statistics relating to one or more topics). The graphics 402 may represent statistics and/or measurements in the form of bar graphs, line graphs, pie charts, and the like. In one or more implementations, the graphics 402 can represent a statistical measurement of the sentiment of a user (e.g., per user) over a predetermined time period. For example, as shown in FIG. 4A, the graphics 402 represent a line graph 404 measuring a sentiment of a user (e.g., all the sentiments the user has provided to one or more user comments 126) over a predetermined time period. More specifically, the graphics 402 may convey sentiment statistics of an individual user (or users) across multiple topics. As shown, the graphics 402 convey the user's sentiments beginning in a neutral position (e.g., no sentiment was provided for that time period). Thus, the system 100 is configured to collect and display an individual users sentiment across multiple topics. In this example, a user may interact with a dot 406 of the line graph 404 to be presented an opinion feed 408 (e.g., a web feed) of the user's sentiments (e.g., comments 128) over a predetermined time period (e.g., twenty-four (24) hours, a week, etc.). Thus, the opinion feed 408 may include each of the user's comments 128 over the predetermined time period. It is contemplated that the opinion feed 408 may also be configured to display one or more comments 128 generated within the system 100 by other users that correspond to the desired topic of interest. In another implementation, the graphics 402 can represent a sentiment of one or more users of a single topic (e.g., keyword portion 128) over a predetermined time period (see FIG. 4B). More specifically, the graphics 402 illustrated in FIG. 4B convey sentiment statistics of multiple users sentiments across a single topic. For example, the graphics 402 can represent line graphs representing measurements of a sentiment of the keyword portion 128 over a predetermined time period (e.g., line graph represents measured sentiment of #fall from all the users over the predetermined time period). In the implementations, described above, a user can interface with one or more interactive interfaces 408 (e.g., interface that is a graphic representing the keyword portion 128) that links to a website related to the keyword portion 128 (e.g., a link to a Wikipedia entry of fall, etc.). Additionally, the module 134 may effectuate the display of an interactive interface 410 via the client device 104. As shown, the graphics 402 convey that the topics begin with a neutral sentiment (e.g., users have not provided a sentiment corresponding to displayed topic). The interactive interface 410 (see FIG. 4B) is configured to cause the display of graphics representing leading opinion makers (e.g., users) by the keyword portion 128. For example, the graphics may represent the top number of users (e.g., largest number of users) that are contributing to a topic (e.g., a display of individual users that are causing sentiment to associate with the keyword portions 128). For instance, the graphics may indicate user A is the opinion maker having the largest number of contributions over a number of topics and that user B is the opinion maker having the second largest amount of contributions over the same number of topics.

Figure 5A:
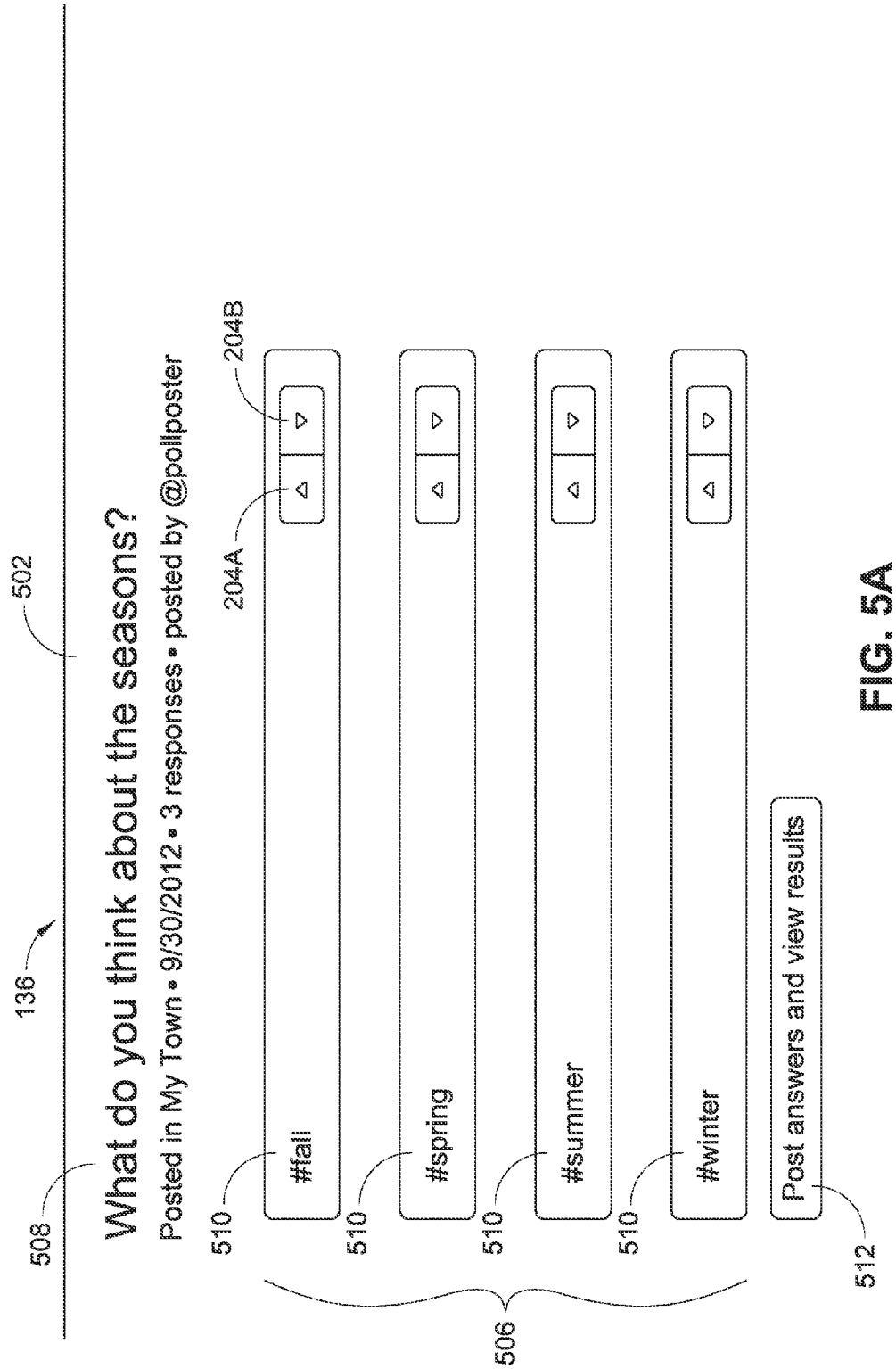

The module 134 is also configured to cause the posting of a poll 502 (see FIG. 5A) and to cause providing of the poll results 504 (see FIG. 5B). In an implementation, the poll 502 may be generated by one or more users via a corresponding client device 104. For example, the user may generate a poll on a topic of interest (e.g., based upon a keyword portion 128) to the user to allow other users the opportunity to provide feedback (e.g., the user's sentiment) with respect to the user-defined poll. In an implementation, a user can interface with the module 134 (by way of the client device 104) to cause the module 134 to post graphics 506 representing the poll 502 (e.g., the poll question 508 and the corresponding selections 510 offered). Interactive interface components 512 allow the user to select the user's desired selection and to submit the selection to the server 102. Additionally, the components 512 may cause the display of poll results 504 to the display 120. It is contemplated that information corresponding to the poll results 504 may be furnished to the user through the opinion feed 408. For example, a user may have answered a poll question within a poll 502 regarding the Nebraska Cornhusker defense. In this example, once the user has selected the desired answer, the module 134 may cause generation of graphics and/or information (e.g., link to a page showing the poll results 504, a graphic representing the poll results 504, etc.) conveying the poll results 504 through an opinion feed 408 corresponding to the general topic of the Nebraska Cornhuskers or the Nebraska Cornhuskers football team (e.g., poll results 504 may be presented through an opinion feed 408 that generally relates or corresponds to the topic of interest of the opinion feed 408).

As shown in FIG. 1, the server 102 also includes a comment tagging standards module 140, which further includes the connected comment tagging module 142 and the adjacent comment tagging module 144. The modules 140, 142, 144 are storable in the memory 112 and executable by the processor 108. It will be understood that the comment tagging standards module 140 may be employed through guidelines provided to a user of a social media network (e.g., a TWITTER user, a FACEBOOK user, etc.). The comment tagging standards module 140 includes one or more rules-based standards 140A relating to a user-generated hashtag identifier 146 and a comment 148 (e.g., a keyword or a topic of interest). For example, the rules-based standards 140A may include a list 150 of pre-determined hashtag identifiers 146 that represent a user-generated attribute (e.g., a positive or negative sentiment or connotation related to the comment 148). For example, the list 150 may include the identifier 146 "#pulseup" to represent a positive connotation. In another example, the list 150 may include the identifier 146 "#pulsedown" to represent a negative connotation. However, it is understood that the list 150 may include various other predetermined user-generated hashtag identifiers 146 to represent positive or negative connotations related to a comment 148. In an implementation, a unique hashtag identifier 146 may be generated to represent a positive or negative connotation. Thus, a unique hashtag identifier 146 may comprise an identifier that may not have a dictionary definition or may have a connotation with a user that is different from an ordinarily accepted dictionary definition. For example, the identifier "#gobstalk" may denote a positive connotation. The hashtag identifier's 146 connotation (e.g., attribute) may be supplied through a user-generated definition, such as metadata, or the like.

The connected comment tagging module 142 and the adjacent comment tagging module 144 may each include a hashtag identifier 146 and a comment 148. The usage of both the connected comment tagging module 146 and the adjacent comment tagging module 148 may require that users utilize: 1) predetermined hashtag identifiers 146 that are either words known to represent opinions, reviews, ratings, predictions, rankings, recommendations, and votes or words designated (e.g., identifiers 146 contained within the list 150, or the like) to represent opinions, reviews, ratings, predictions, rankings, recommendations, and votes; and 2) comments 148 without spacing between multi-word keywords. This rules-based and standardized approach to hashtag identifiers 146 and comments 148, as well as the combination of hashtag identifiers 146 and comments 148 allow for the extraction, sorting, and storage of user-generated comments 148 to and from the user-generated comments database 126. Users of a social media communication network, such as TWITTER, FACEBOOK, GOOGLE+, LINKEDIN, or the like, post user-generated comments 128 within the social media communication network (e.g., user furnishes a tweet or an update, etc.) according to the comment tagging standards module 140. A user-generated comment 128, which is identified using either the connected comment tagging module 142 or the adjacent comment tagging module 144, may signify the user's comment, rating, belief, judgment, or other conclusion, represented by the hashtag identifier 146, with regards to the comment 148. In an implementation, the comment 148 may represent 1) text, including, but not limited to: movie titles, a restaurant, a food, a public figure, an event, a sports team, a sports league, a product name, a stock symbol, a book, and a song title; or 2) a hypertext link, including, but not limited to: links to a photo, an article, a product, a website, or a blog. Thus, the respective modules 142, 144 are configured to cross-reference the identifier 148 with the rules-based standard 140A to determine which sentiment, or connotation, the user is applying to the comment 148 (e.g., the module 142 cross-references based upon the connected rules and the module 144 cross-references based upon the adjacent rules).

Table 1 illustrates the usage of the connected comment tagging module 142 where the comment 150 is connected to the hashtag identifier 146. In the connected comment tagging module 142, the characters in the hashtag identifier 146 are not separated from the characters in the comment 148. In addition, multi-word comments 148 are not separated by spaces when entered by the user.

TABLE 1

Illustration of functionally related to the connected comment tagging module

| Hashtag Identifier | Comment | User-generated Comment |
| --- | --- | --- |
| #identifier1 | keyword1 | #identifier1keyword1 I like keyword1 |
| #identifier2 | keyword1 | #identifier2keyword1 I don't like keyword1 |
| #identifier3 | keyword1 | #identifier3keyword1 I am indifferent about keyword1 |

An example of the connected comment tagging module 142 may be where a social media communication network user posts a favorable comment about "Don's Sushi." Following the comment tagging standards module 140 where spaces are removed from multi-word comments 148 and using the connected comment tagging module 142, the user may post: "#greatdonssushi excellent food, love it." The connected comment tagging module 142 may parse the user-generated comment 128 to extract the hashtag identifier 146 by way of cross-referencing the comment 128 with the comment tagging standards module 140 (where the comment tagging standards module 140 includes "#great" and associates "great" with a positive connotation). Thus, the module 140 can determine the comment 148 is "donssushi" by parsing the remaining portion of the comment 128 (e.g., the portion of the comment after "#great") The combination of the hashtag identifier 146 "#great" with the comment 148 "donssushi," as well the descriptive commentary following "donssushi," in this case "excellent food, love it," translates into a favorable user-generated comment 128 (by way of a pre-determined positive connotation relating to the hashtag identifier 146 stored in the list 150) regarding "Don's Sushi."

Table 2 illustrates the usage of the adjacent comment tagging module 144 in a social media communication network where the comment 148 is adjacent to the hashtag identifier 146. In the adjacent comment tagging module 144, the characters in the hashtag identifier 146 are separated by a space from the characters in the comment 148. In the adjacent comment tagging module 144, the comment 148 can either precede or follow the hashtag identifier 146. In addition, multi-word comments 148 are not separated by spaces when entered by the user.

TABLE 2

Illustration of functionality related to the adjacent comment tagging module

| Hashtag identifier | Comment | User-generated Comment in TWITTER |
| --- | --- | --- |
| #identifier1 | keyword1 | #identifier1keyword1 I like keyword1 |
| #identifier2 | keyword1 | #identifier2keyword1 I don't like keyword1 |
| #identifier3 | keyword1 | #identifier3keyword1 I am indifferent about keyword1 |

An example of the adjacent comment tagging module 144 may be where a social media communication network user may post an unfavorable comment about "Don's Sushi." Following the comment tagging standards module 140 where spaces are removed from multi-word comments 148 and using the adjacent comment and tagging module 126, the user may post: "#bad donssushi rotten food, don't like it." In this example, the hashtag identifier 146 is "#bad" and the comment 148 is "donssushi." The module 140 parses the user-generated comment 128 (e.g., the posting) to extract the identifier 146 and the comment 148. The module 140 can determine that the identifier 146 is a negative connotation (by way of cross-referencing the identifier with the comment tagging standards module 140) and relating the negative connotation to the comment 148. Thus, the combination of the hashtag identifier 146 "#bad" with the comment 148 "donssushi," as well as the descriptive commentary following "donssushi", in this case "rotten food, don't like it." translates into an unfavorable user-generated comment 128 about "Don's Sushi."

The module 140 may be configured to furnish display instructions to the client device 104 to cause the client device 104 to display one or more items as directed by the module 140. For instance, the module 140 may furnish instructions to cause the client device 104 to display (but not limited to) graphical items (e.g., charts, etc.) and textual (e.g., user-generated comments 128, etc.) items. For example, the module 140 may cause the client device 104 to display graphics representing chart types, such as a pie chart, scatter chart, table, line chart, bar chart, area chart, or column chart that may be rendered using one of many technologies including HTML5/SVG to provide cross platform portability to ANDROID, IPADs, and IPHONEs and cross-browser compatibility. The module 140 may furnish instructions that relate to a common class, including, but not limited to JAVASCRIPT, where user-generated comment 128 data from the user-generated comments database 126, may be utilized to populate charts. For example, the module 140 may furnish instructions to cause the client device 104 to display a line graph showing a comment 148 and a hashtag identifier 146 over a pre-defined time interval, such as an hour, a day, a week, a month, a year-to-date, a year, or a user determined interval (as well as the connotation, or sentiment, relating to the hashtag identifier 146).

Thus, in a specific implementation, the present disclosure may allow for 1) a hashtag identifier 146 allowing users to explicitly convey favorable, neutral, unfavorable, descriptive, and/or predictive attributes about comments 148 (e.g., topics or subjects of interest to the user); 2) the aggregation of stated user-generated comments 128 from social media communication networks; 3) textual and graphical display of aggregated user comments 128; and 4) displacement of imprecise user-generated comment algorithms that attempt to discern comments from non-standardized text and statistical analysis. As described above, in an implementation, the display may be a line graph showing a comment 148 and a hashtag identifier 146 over a pre-defined interval such as an hour, day, week, month, year-to-date, year or user determined interval. The graphical display could also be in the form of a pie chart based on custom intervals and showing the percentage of favorable and unfavorable hashtag identifiers 146 for each comment 148. It is understood that the system 100 may be implemented utilizing client-side protocols, server-side protocols, combinations thereof, and so forth.

EXAMPLE METHODS

Figure 6:
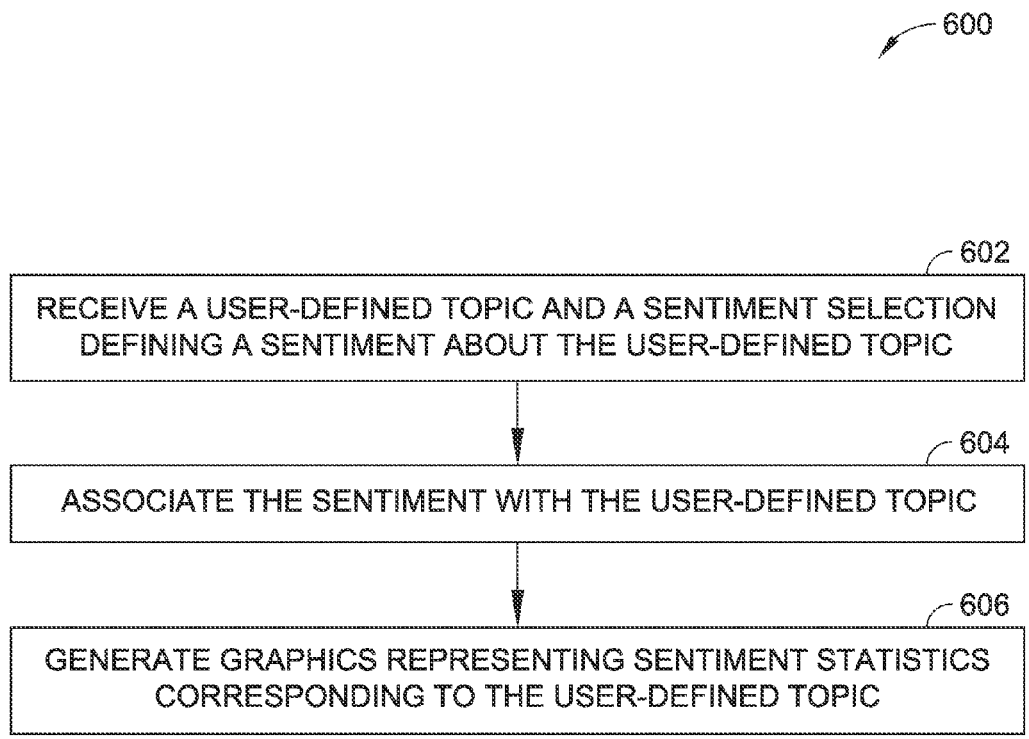
FIG. 6 is flow diagram illustrating an example method for associating a sentiment with a user-defined topic in accordance with the present disclosure.

FIG. 6 illustrates an example method 600 for associating a sentiment to a user comment. As shown in FIG. 6, a user-defined topic and a sentiment selection defining a sentiment are received (Block 602). As described in greater detail above, the user is presented with one or more interactive components (e.g., input fields 202A, 202B) for receiving one or more comments (topics) 128 (e.g., keyword portion 130) and at least two interactive components (e.g., buttons 204A, 204B) for associating a sentiment with the comments 128. The user may input the keyword portion 130 to define a desired topic of interest and then select a corresponding button 204A, 204B to select a sentiment the user wishes to associate with the keyword portion 130.

The selected sentiment is then associated with the user-defined topic (Block 604). The module 134 is configured to cause the user selected sentiment to be associated with the keyword portion 130 of the comment 128. Thus, the sentiment comprises a sentiment portion of the keyword portion 130 that defines the user's sentiment with respect to the topic or subject defined by the sentiment selection. In a specific implementation, once associated, the keyword portion 130 represents at least one of a positive connotation or a negative connotation as defined by the sentiment selection. As described above, each of the sentiment selections and the comments 128 may be stored in the memory 112 and/or the user-generated comments database 126.

As shown in FIG. 6, graphics representing sentiment statistics corresponding to the user-defined topic are generated (Block 606). As described above with respect to FIGS. 2 through 5B, the module 134 causes the generation of graphics 502 to convey sentiment statistics relating to one or more comments 128 (e.g., topics or subjects defined by the user). Specifically, the graphics 502 may convey sentiment statistics corresponding to the keyword portion 128, sentiment statistics corresponding to a specific user (e.g., graphics representing sentiment statistics corresponding to a user's sentiment relating to multiple topics/subjects), and so forth.

CONCLUSION

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. Although the functionality of various implementations are described above with respect to FIGS. 1 through 6 as being embodied in software or code executed by hardware as discussed above, the same may also be embodied in dedicated hardware or a combination of software/hardware and dedicated hardware. If embodied in dedicated hardware, the functionality of these components can be implemented as a circuit or state machine that employs any one of or a combination of a number of technologies. These technologies may include, but are not limited to: discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

What is claimed is:

1. A non-transitory computer-readable medium embodying a program executable in at least one computing device, the program comprising:
   code that initiates a poll;
   code that, in response to the poll, receives a hashtag identifier comprising a subject of the poll and a keyword that identifies a user-generated response to the poll;
   code that determines the subject of the poll and the user-generated response to the poll based upon an adjacency of the hashtag identifier and the keyword;
   code that aggregates a plurality of hashtag identifiers and corresponding keywords to form an aggregated response to the poll; and
   code that causes storage of the aggregated response,
   wherein the user-generated response comprises a user-generated definition based upon metadata associated with the hashtag identifier.

2. The non-transitory computer-readable medium as recited in claim 1, wherein the program further comprises: code to cause generation of one or more graphics representing the aggregated response.

3. The non-transitory computer-readable medium as recited in claim 2, wherein the graphics represent at least one of a line graph, a pie chart, or a scatter chart to convey sentiment statistics over the predetermined time period.

4. The non-transitory computer-readable medium as recited in claim 2, wherein the one or more graphics are generated at a client device.

5. The non-transitory computer-readable medium as recited in claim 1, wherein the program further comprises code that determines the subject of the poll and the user-generated response to the poll based upon an immediate adjacency of the hashtag identifier and the keyword.

6. The non-transitory computer-readable medium as recited in claim 1, wherein the program further comprises code that cross-references the hashtag identifier with one or more predefined sentiments; code that determines a sentiment of the hashtag identifier based upon the cross-reference; code that forms a response to the poll.

7. A system comprising:
   at least one computing device in communication with a client device, the at least one computing device including:
   a memory operable to store one or more modules;
   a processor coupled to the memory, the processor operable to execute the one or more modules to cause the processor to:
   initiate a poll;
   in response to the poll, receives a hyperlink comprising a subject of the poll and a hashtag identifier that identifies a user-generated response to the poll;
   determine the subject of the poll and the user-generated response to the poll based upon an adjacency of the hashtag identifier and the hyperlink;
   form an aggregated response to the poll based upon a plurality of hashtag identifiers and the hyperlink; and
   causes storage of the aggregated response to the memory.

8. The system as recited in claim 7, wherein the one or more modules, when executed by the processor, are operable to cause the processor to cause generation of one or more graphics representing the aggregated response.

9. The system as recited in claim 8, wherein the graphics represent at least one of a line graph, a pie chart, or a scatter chart to convey statistics of the aggregated response over the predetermined time period.

10. The system as recited in claim 8, wherein the one or more graphics are generated at a client device.

11. The system as recited in claim 7, wherein the one or more modules, when executed by the processor, are operable to cause the processor to determine the subject of the poll and the user-generated response to the poll based upon an immediate adjacency of the hashtag identifier and the hyperlink.

12. The system as recited in claim 7, wherein the one or more modules, when executed by the processor, are operable to cause the processor to cross-reference the hashtag identifier with one or more predefined sentiments defined within a rules-based list; and determine a sentiment of the hashtag identifier based upon the cross-reference.

13. The system as recited in claim 12, wherein the sentiment conveys at least one of a favorable, neutral, or unfavorable sentiment corresponding to the hashtag identifier.

* * * * *